United States Patent
Khan et al.

(10) Patent No.: US 10,018,273 B2
(45) Date of Patent: Jul. 10, 2018

(54) SEAL PROTECTION SYSTEM

(71) Applicant: Generac Power Systems, Inc., Waukesha, WI (US)

(72) Inventors: Mir Khan, Kenosha, WI (US); Alexander Kobryn, Deerfield, WI (US); Matthew A. Lownik, Waukesha, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 6 days.

(21) Appl. No.: 15/066,135

(22) Filed: Mar. 10, 2016

(65) Prior Publication Data

US 2016/0265667 A1   Sep. 15, 2016

Related U.S. Application Data

(60) Provisional application No. 62/130,925, filed on Mar. 10, 2015.

(51) Int. Cl.
*F16J 15/32* (2016.01)
*F16J 15/34* (2006.01)
*F16J 15/324* (2016.01)

(52) U.S. Cl.
CPC ......... *F16J 15/3404* (2013.01); *F16J 15/324* (2013.01); *F16J 15/3456* (2013.01)

(58) Field of Classification Search
CPC ..... F16J 15/3404; F16J 15/324; F16J 15/3456
See application file for complete search history.

(56) References Cited

U.S. PATENT DOCUMENTS

| | | | |
|---|---|---|---|
| 3,051,497 A * | 8/1962 | Wigg | F01D 11/04 277/389 |
| 3,079,605 A | 2/1963 | Thomas et al. | |
| 3,356,378 A * | 12/1967 | Tracy | F16J 15/3464 277/397 |
| 4,094,512 A * | 6/1978 | Back | F16J 15/008 277/320 |
| 4,865,333 A | 9/1989 | Winslow | |
| 4,990,055 A | 2/1991 | Korenblit | |
| 5,791,564 A | 8/1998 | Carra | |
| 6,019,125 A | 2/2000 | Reverberi | |
| 6,112,641 A | 9/2000 | Magri et al. | |
| 6,142,061 A | 11/2000 | Bandieri et al. | |
| 6,155,494 A | 12/2000 | Fabbri et al. | |
| 6,431,766 B1 | 8/2002 | Fabbri et al. | |
| 6,508,386 B2 | 1/2003 | Magri | |
| D528,982 S | 9/2006 | Reverberi | |
| D532,166 S | 11/2006 | Reverberi | |
| D532,793 S | 11/2006 | Reverberi | |
| D536,005 S | 1/2007 | Reverberi | |

(Continued)

FOREIGN PATENT DOCUMENTS

EP   1510698 A2   3/2005

*Primary Examiner* — Gilbert Y Lee
(74) *Attorney, Agent, or Firm* — Boyle Fredrickson, S.C.

(57) ABSTRACT

A seal protection system includes a housing located on a dry side of a seal and adjacent to the frame of a pump. The housing, in part, defines a cooling chamber adjacent to the seal in which a cooling liquid may be circulated. The cooling liquid may be contained within the chamber or within a reservoir removed from the chamber. The cooling liquid circulates within the chamber to keep the seal cool even if the pump is operating under dry conditions.

19 Claims, 10 Drawing Sheets

(56) References Cited

U.S. PATENT DOCUMENTS

| | | |
|---|---|---|
| D539,817 S | 4/2007 | Reverberi |
| 7,281,903 B2 | 10/2007 | Reverberi et al. |
| 7,611,337 B2 | 11/2009 | Reverberi et al. |
| 7,658,597 B2 | 2/2010 | Rocci et al. |
| D613,765 S | 4/2010 | Reverberi et al. |
| D613,766 S | 4/2010 | Reverberi et al. |
| D616,467 S | 5/2010 | Reverberi et al. |
| D633,101 S | 2/2011 | Magri |
| D633,102 S | 2/2011 | Magri |
| D633,103 S | 2/2011 | Magri |
| D633,104 S | 2/2011 | Magri |
| D633,105 S | 2/2011 | Magri |
| D633,406 S | 3/2011 | Magri |
| 8,408,886 B2 | 4/2013 | Fabbri |
| D688,273 S | 8/2013 | Magri |
| D702,262 S | 4/2014 | Magri |
| 2011/0030822 A1 | 2/2011 | Bear et al. |
| 2014/0072463 A1 | 3/2014 | Korupp et al. |
| 2014/0241908 A1 | 8/2014 | Magri |

\* cited by examiner

SEAL PROTECTION SYSTEM

CROSS-REFERENCE TO RELATED APPLICATIONS

This application claims priority from U.S. Provisional Patent Application Ser. No. 62/130,925 filed on Mar. 10, 2015, the entirety of which is expressly incorporated by reference herein.

FIELD OF THE INVENTION

The subject matter disclosed herein relates generally to a system to protect a seal around a rotating member and, in particular, to a system to protect a seal which is normally cooled by a fluid present on one side of the seal if that fluid is not present.

BACKGROUND AND SUMMARY OF THE INVENTION

As is known, a pump includes a mechanical device, such as an impeller, to draw water from a reservoir and discharge the water through a conduit, such as a pipe or a tube where it may be delivered to a desired location. The impeller is rotated by a drive shaft, which is typically driven by an engine. The impeller is fully or partly submersed within the fluid to be discharged by the pump and, therefore, a seal is required around the driveshaft between the impeller and the engine to prevent the fluid from leaking out of the reservoir.

The seal includes at least two primary components. A first component is mounted to a stationary surface, such as the housing of the reservoir and a second component is mounted to the drive shaft, which is a rotating surface. Each of the first and second components includes a seal face and the two seal faces are biased together, for example, via a spring. As the drive shaft rotates friction between the two seal faces generates heat. Without cooling, the heat can build up to a sufficient level to cause the seal to fail and create a leak.

It is also known that the fluid being drawn through the pump by the impeller may be used to cool the seal. The pump may, for example, include a passage around the impeller or an auxiliary discharge path that directs the fluid to the surface of the seal located within the reservoir. Rotation of the impeller causes the fluid to either move around the impeller or through the auxiliary discharge path to the seal. A return path from the seal to the reservoir may also be defined, allowing heated fluid to return to the reservoir and cooler fluid to be supplied around the seal.

However, relying on the fluid being drawn through the pump to cool the seal is not without certain disadvantages. The pump may not get properly primed prior to operation. As a result, initial operation of the engine and pump may occur with no fluid being drawn through the pump. During operation, debris may partially or fully block the flow of fluid to the pump. In certain applications, the fluid being drawn through the pump may be drawn from a tank and, therefore, of limited volume. If the volume of the tank is not monitored, the fluid from the tank may be completely discharged leaving no fluid to cool the seal. In such instances, where the pump is operated in a "dry" condition (i.e, no fluid flowing through the pump) the engine continues to drive the pump, continuing to generate heat between the seal faces. If the pump operates for too long under a "dry" condition, the heat accumulated in the seal may be sufficient to damage the seal. Once damaged, the seal no longer prevents fluid flow between the pump and the engine, which may either cause fluid leakage from the pump or may cause damage to the engine.

Therefore, it is a primary object and feature of the present invention to provide a cooling system for a seal between a pump and the prime mover of the pump which will cool the seal if the pump is operated under "dry" conditions.

According to one embodiment of the invention, a system to protect a first seal between a stationary frame and a rotating shaft is disclosed. The system includes a seal housing, a second seal, a reservoir, a supply line, and a return line, where the supply and return lines are in fluid communication between the reservoir and the seal housing. The seal housing includes an inlet passage to conduct a cooling fluid, an outlet passage to conduct the cooling fluid, and an opening through which the rotating shaft extends. The seal housing is operatively connected to the stationary frame proximate the first seal. The seal housing and the first seal, at least in part, define a cavity adjacent the first seal, and the cavity is in fluid communication with the inlet passage and the outlet passage to receive the cooling fluid. The second seal is operatively connected between the opening in the seal housing and the rotating shaft to prevent the cooling fluid from flowing through the opening in the seal housing. The reservoir holds the cooling fluid and the cooling fluid is transferred between the reservoir and the inlet and outlet passages via the supply and return lines, respectively.

According to another aspect of the invention, the seal housing may include a first wall and an outer surface. The first wall includes the opening extending through the seal housing and extends generally orthogonal to the rotating shaft. The outer surface extends generally orthogonal to the first wall, around the periphery of the first wall, and towards the seal. The inlet passage and the outlet passage may extend through the outer surface. In one embodiment of the invention, the first wall is annular and the outer surface is an outer ring.

According to other aspects of the invention, the reservoir may be gravity-fed or pump-driven. In a gravity-fed embodiment, the reservoir may include an outlet in fluid communication with the supply line and an inlet in fluid communication with the return line. The reservoir is located above the seal housing and the inlet is displaced further from the seal housing than the outlet. In a pump-driven embodiment, the reservoir may include a pump operable to draw the cooling fluid into the reservoir via the return line and deliver the cooling fluid to the seal housing via the supply line.

According to still another aspect of the invention, the system may include an outer housing having an opening through which the rotating shaft extends. The outer housing may be operatively connected to the stationary frame and receives the first seal operatively connected between the opening in the outer housing and the rotating shaft to prevent the cooling fluid from flowing through the opening in the outer housing. The seal housing, the outer housing, the first seal, and the second seal may define the cavity adjacent the first seal to receive the cooling fluid.

According to another embodiment of the invention, a system to protect a first seal between a stationary frame and a rotating shaft includes a seal housing and second seal. The seal housing has an inlet passage to conduct a cooling fluid, an outlet passage to conduct the cooling fluid, and an opening through which the rotating shaft extends. The seal housing is operatively connected to the stationary frame proximate the first seal. The seal housing and the first seal, at least in part, define a cavity adjacent the first seal, where the cavity is in fluid communication with the inlet passage and the outlet passage to receive the cooling fluid. The second seal is operatively connected between the opening in the seal housing and the rotating shaft to prevent the cooling fluid from flowing through the opening in the seal housing, and the cooling fluid circulates through the cavity via the inlet and the outlet to cool the first seal.

According to another aspect of the invention, the seal housing may include a first member and a second member. The first member is operatively connected to the stationary frame and includes a first opening through which the rotating shaft extends. The second seal is operatively connected between the first opening in the first member and the rotating shaft to prevent the cooling fluid from flowing through the first opening. The second member is operatively connected to the stationary frame and includes a second opening through which the rotating shaft extends. The first seal is operatively connected between the first opening in the second member and the rotating shaft to prevent the cooling fluid from flowing through the second opening. The inlet passage and the outlet passage may be located in either the first member or the second member. Optionally, the second seal may be integrally formed in the seal housing.

According to yet another embodiment of the invention, a system for protecting a pump seal is disclosed. The pump seal is mounted to a drive shaft rotated by a prime mover to operate a pump, and the pump seal is operatively mounted to the drive shaft to prevent fluid flow from a chamber within the pump along the drive shaft. The system includes a seal housing, a second seal, a reservoir, a supply line, and a return line, where the supply and return lines are in fluid communication between the reservoir and the seal housing. The seal housing includes an inlet passage to conduct a cooling fluid, an outlet passage to conduct the cooling fluid, and an opening through which the rotating shaft extends. The seal housing is operatively connected to a stationary frame proximate the pump seal. The seal housing and the pump seal, at least in part, define a cavity adjacent the pump seal, wherein the cavity is in fluid communication with the inlet passage and the outlet passage to receive the cooling fluid. The second seal is operatively connected between the opening in the seal housing and the rotating shaft to prevent the cooling fluid from flowing through the opening in the seal housing. The reservoir holds the cooling fluid, and the supply and return lines deliver the cooling fluid to the inlet and outlet passages, respectively. The stationary frame to which the seal housing is operatively connected may be either a housing for the prime mover or a housing for the pump.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
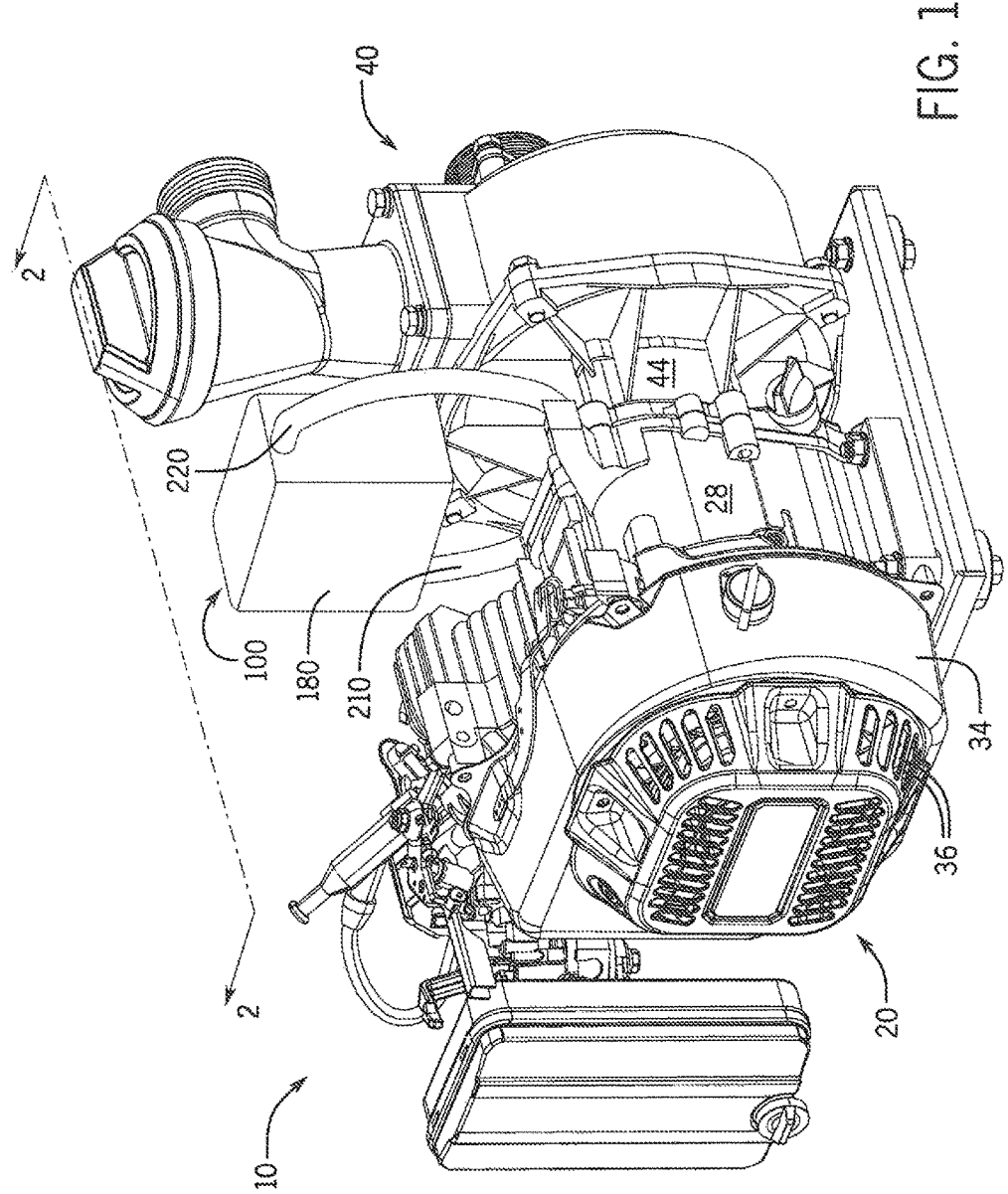
FIG. 1 is an isometric view of an exemplary pump system incorporating the pump seal system according to one embodiment of the invention.
Figure 2:
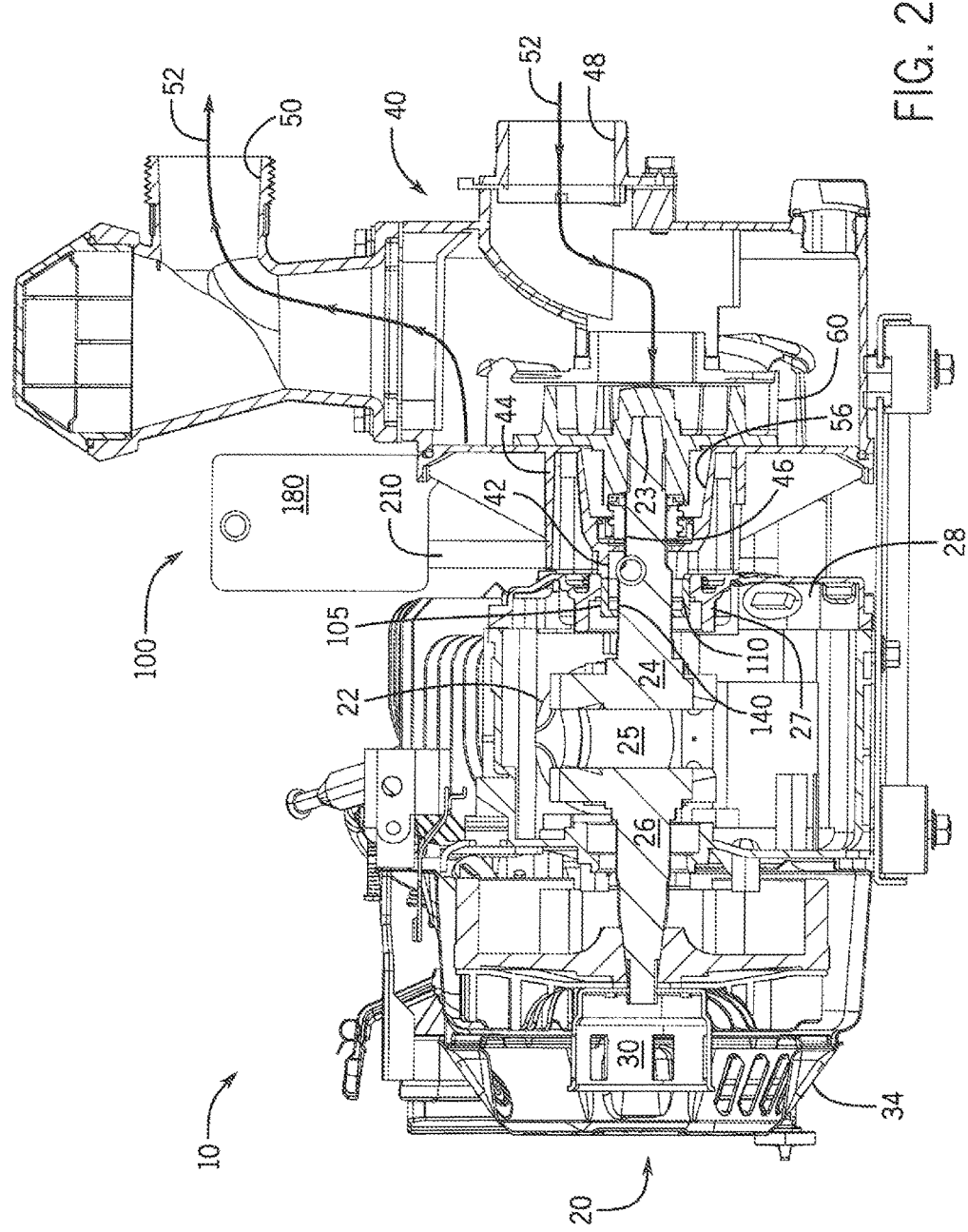
FIG. 2 is a sectional view of FIG. 1 taken at 2-2.
Figure 3:
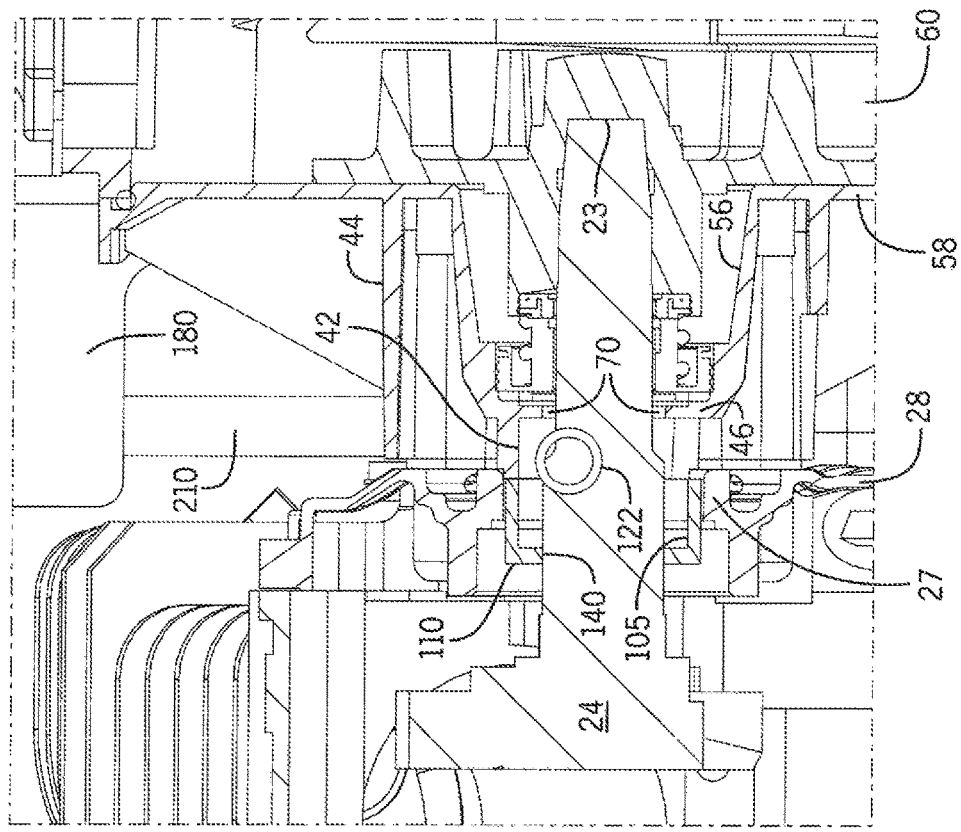
FIG. 3 is a partial sectional view of FIG. 2.
Figure 4:
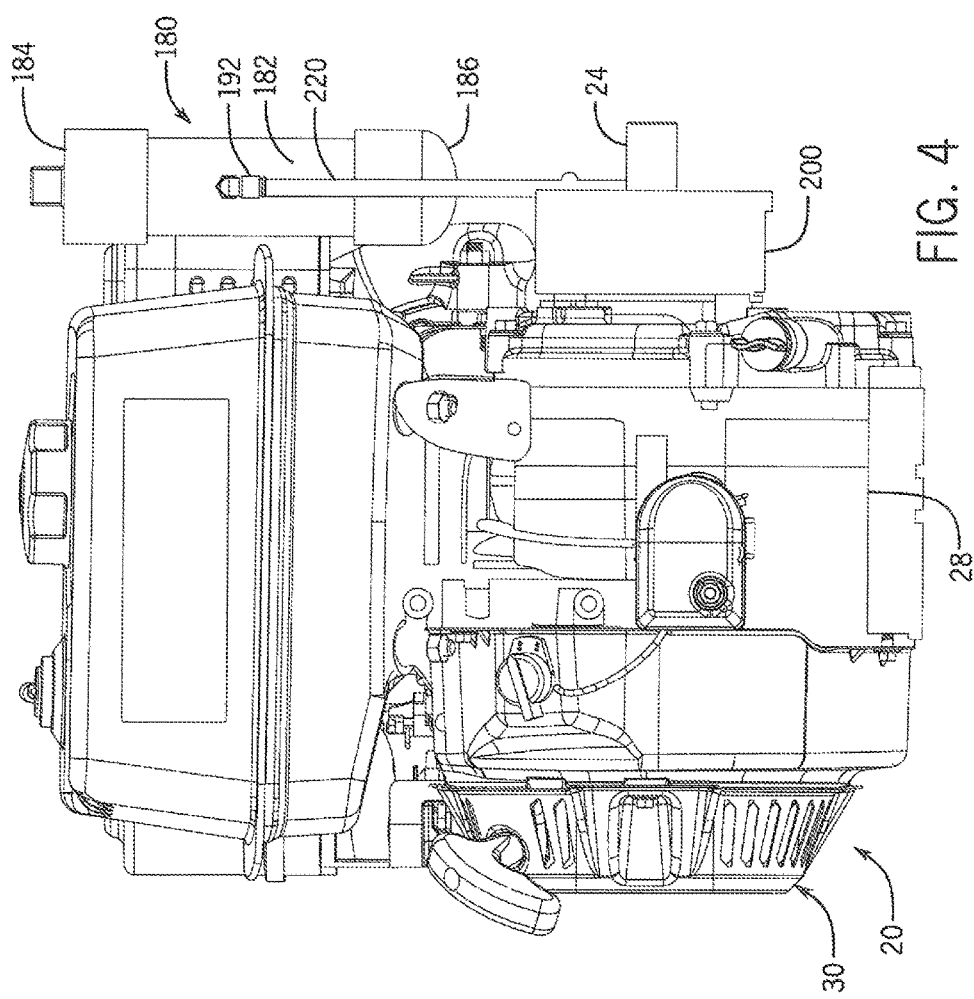
FIG. 4 is a side elevation view of an exemplary pump system incorporating the pump seal system according to another embodiment of the invention.

Referring to FIG. 1, a pump system 10 including an engine 20 and a pump 40 is illustrated. According to the illustrated embodiment, the engine 20 serves as the prime mover for the pump system 10 and is a single-cylinder, two-stroke engine. It is contemplated that various other prime movers including, but not limited to, electric motors, turbines, multi-cylinder and/or four-stroke engines may be utilized without deviating from the scope of the invention. Referring also to FIGS. 2 and 3, the illustrated engine 20 includes a cylinder 22 in which a piston 25 reciprocates. A connecting rod (not shown) joins the piston 25 to a first drive shaft 24 and a second drive shaft 26. For reference, the first drive shaft 24 will be said to extend toward the front of the motor housing 28 and the second drive shaft 26 will be said to extend toward the rear of the motor housing 28. It is understood that various other orientations and descriptions, such as up and down, left and right, or side to side may be used to describe the orientations of the drive shafts 24, 26 without deviating from the scope of the invention.

According to the illustrated embodiment, the engine 20 is a fan-cooled engine. The second drive shaft 26 extends through an opening in the rear of the motor housing 28 and is coupled to a fan 30. The fan 30 includes a plurality of blades which are rotated as the fan rotates via the connection to the second drive shaft 26. Air is drawn in through openings 36 in the fan housing 34. The air may pass through cavities within the engine housing 28 and/or over the outer surface of the engine housing 28 according to the configuration of the air outlets from the fan 30.

The engine 20 is controlled to drive the pump 40 via the first drive shaft 24. The first drive shaft 24 extends through an opening 27 in the front of the motor housing 28. The opening 27 is aligned with a corresponding opening 42 in a flange 44 on the pump 40. The flange 44 is secured to the motor housing 28 via bolts or other suitable methods as would be understood in the art. A seal 70 is fit over the first drive shaft 24 and against a seat 46 within the flange 44. The seal 70 is configured to prevent the fluid being drawn through the pump 40 from flowing into the motor housing 28. An impeller 60 is mounted to the end 23 of the first drive shaft 24 which is distal from the engine 20. Rotation of the impeller 60 draws fluid through an inlet 48 of the pump 40, along an illustrated flow path 52 and into the impeller 60. Blades on the impeller 60 discharge fluid radially from the impeller, along the illustrated flow path 52, and through an outlet 50 of the pump 40.

Rotation of the first drive shaft 24 causes heat to be generated at the seal 70 within the flange 44. It is contemplated that the seal 70 may be selected from any of a number of types of mechanical seals. According to one embodiment of the invention, the seal 70 is a stationary member secured against the seat 46. The stationary seal 70 includes, for example, a resilient surface configured to engage the first drive shaft 24 where the resilient surface may be compressed as a result of the engagement to the drive shaft 24, and the biasing force of the resilient surface establishes a seal against the drive shaft 24. According to another embodiment of the invention, the seal 70 includes a stationary member and a rotating member. The stationary member is secured against the seat 46 and the rotating member is mounted to the drive shaft 24. Each of the stationary and rotating members includes a seal face. The two seal faces are configured to engage each other such that the seal face on the rotating member moves past the seal face of the stationary member. A biasing member, such as a spring may be included in the rotating member to bias the seal face of the rotating member against the seal face of the stationary member, preventing fluid from leaking past. As the seal faces wear, the spring continues to bias the two seal faces together to prevent the fluid from leaking past the seal. Optionally, still other configurations of seals may be utilized without deviating from the scope of the invention. In either embodiment of the seal, a rotating surface passes a stationary surface due to the rotation of the drive shaft 24. The rotating surface and the stationary surface engage each other to prevent leaks; however, the engagement also results in friction during rotation of the drive shaft 24. The friction between the two surfaces generates heat in the seal 70.

When the impeller 60 is drawing fluid through the pump 40, a portion of the fluid cools the seal 70. Although the rear of the impeller 60 rotates past the rear surface of the pump housing 58, a gap exists between the impeller 60 and the pump housing 58 to avoid wear on the two components. In some embodiments, the pump 40 may include cooling channels that draw fluid from the fluid flow path 52 around the impeller to the cavity 56 within the flange. Optionally, auxiliary flow paths may be established from the outlet of the impeller 60 to the cavity 56. Similarly, fluid present in the cavity 56 may be displaced from the cavity 56 back around the impeller 60 by the new fluid entering. Optionally, return channels may be designed in the pump 40 to allow the fluid to return to the impeller housing or to the reservoir from which the fluid is being drawn. The circulation of fluid on the front surface of the seal 70 draws heat generated within the seal away from the seal 70.

The pump system 10 illustrated in FIGS. 1-3 includes one embodiment of a seal protection system 100. The seal protection system 100 is operable to provide additional cooling of the seal 70 between the pump 40 and the engine 20. The seal protection system 100 includes a seal housing 110, lip seal 140, reservoir 180, supply line 210, and return line 220. The lip seal 140 and seal housing 110 are inserted onto the drive shaft 24 until they are received, at least in part, within the opening 27 on the front of the motor housing 28. The pump 40 is then mounted to the motor housing 28 as discussed above. The seal housing 110 of the seal protection system 100 aligns with the opening 42 in the flange to define an oil chamber 105, as will be discussed in more detail below. It is contemplated that the seal housing 110 of the seal protection system 100 may be secured to the flange 44 of the pump 40 via bolts threaded in from the inside of the pump 40. Optionally, a first surface 114 of the face 112 of the seal housing 110 (see FIG. 9) may engage a seat on the front of the motor housing 28. It is further contemplated that a sealing member, such as a gasket may be fitted between the seal housing 110 of the seal protection system 100 and the flange 44 of the pump 40 to prevent leakage between the two members.

Figure 8:
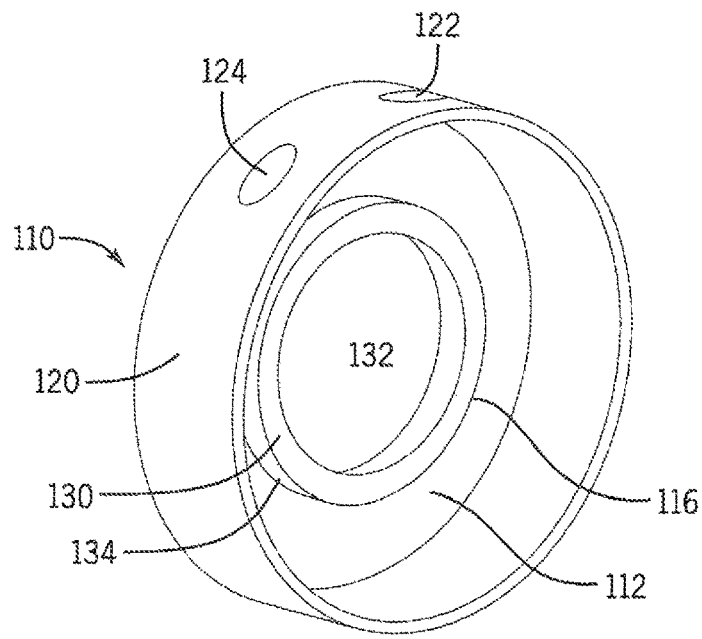
FIG. 8 is a perspective view of one embodiment of a seal housing for the seal protection system from a side, top, and rear view.
Figure 9:
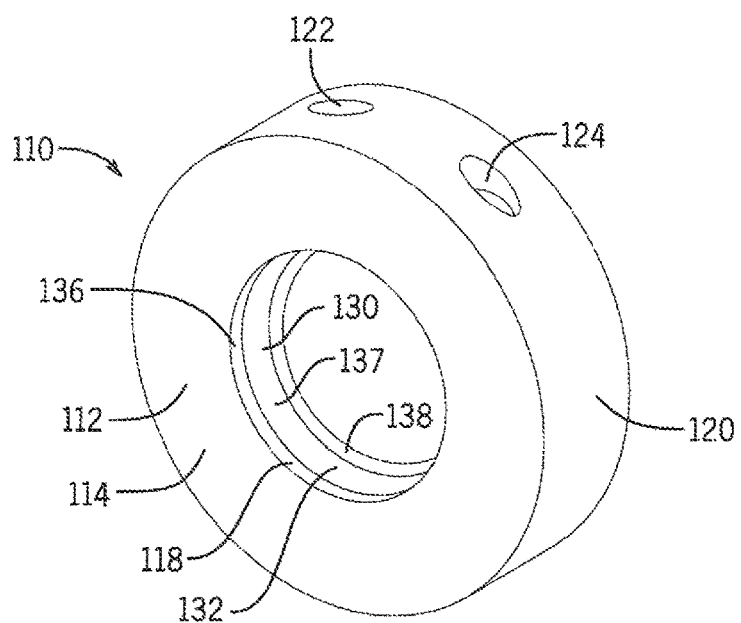
FIG. 9 is a perspective view of the seal housing of FIG. 5 from a side, top, and front view.

The seal housing 110 defines, at least in part, a chamber in which cooling fluid may be introduced to provide additional cooling of the seal 70. Referring also to FIGS. 8 and 9, the seal housing 110 includes an annular face 112 having a first surface 114 and a second surface 116 opposite the first surface 114. The first surface 114 faces toward the engine 20 and the second surface 116 faces toward the pump 40. A first opening 118 extends through the center of the annular face 112 and is of a sufficient diameter to receive the first drive shaft 24. An outer ring 120 protrudes generally orthogonal to and around the periphery of the second surface 116. Two additional openings pass through the outer ring 120 of the seal housing. A first of the additional openings defines an inlet passage 122 and a second of the additional openings defines an outlet passage 124. An inner ring 130 protrudes generally orthogonal to and around the periphery of the opening 118 and in the direction of the second surface 116, and the inner ring 130 protrudes from the annular face 112 for a shorter distance than the outer ring 120. The inner ring 130 includes a first surface 132 and a second surface 134. The first surface 132 faces the center axis of the seal housing 110 and the second surface 134 faces the outer ring 120. According to the illustrated embodiment, the first surface 132 includes a recessed portion 137 located between a first lip 136 and a second lip 138. The first lip 136 is generally coplanar with the first surface 114 of the annular face 112. The second lip 138 extends around the inner periphery of the inner ring 130 and protrudes toward the central axis of the seal housing 110. The width of the recessed portion 137 is sufficient to receive a lip seal 140 within the recessed portion 137. The first and second lips 136, 138 restrict axial movement of the lip seal 140 after being inserted within the seal housing 110. The seal housing 110 is preferably constructed of a rigid material and the lip seal 140 is preferably constructed of a resilient material. Although the outer ring 120 of the seal housing 110 was described as a generally cylindrical form, it is contemplated that the outer ring 120 may define various other outer peripheries, where the cross-section of the outer ring 120 may be, for example, square, rectangular, or other polygonal forms without deviating from the scope of the invention.

Figure 10:
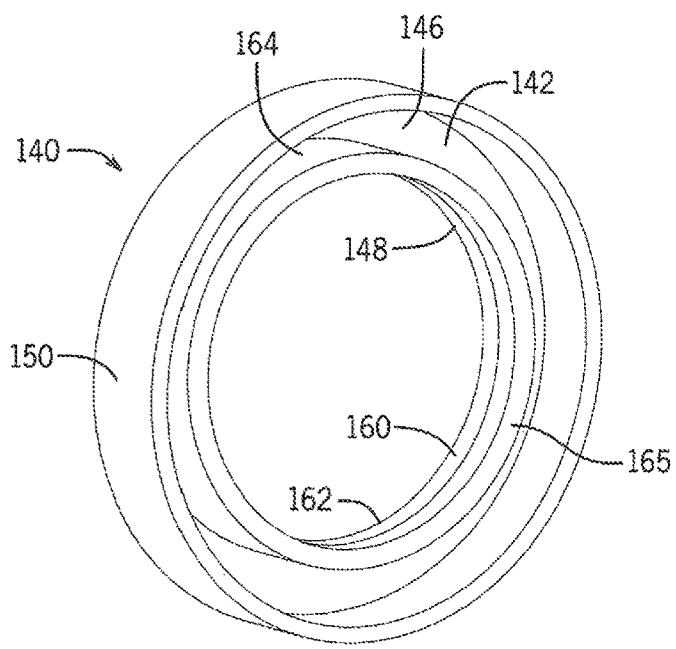
FIG. 10 is a perspective view of one embodiment of a lip seal for the seal protection system from a side, top, and rear view.
Figure 11:
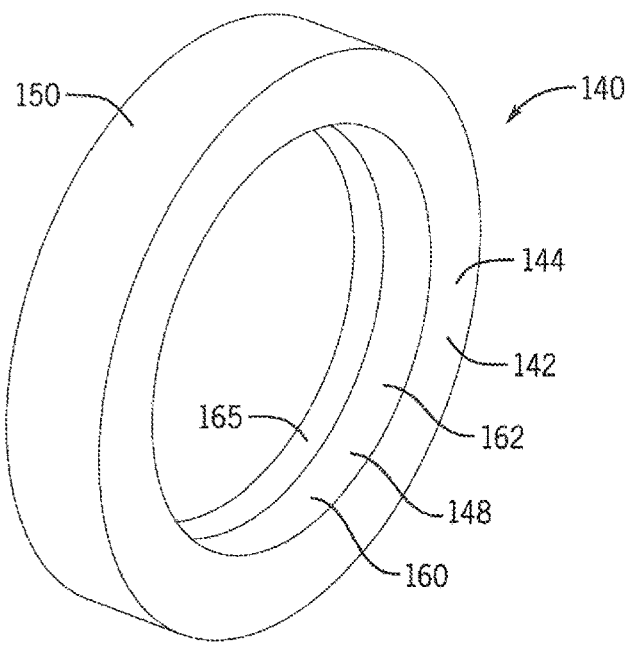
FIG. 11 is a perspective view of the lip seal of FIG. 7 from a side, top, and front view.

With reference also to FIGS. 10 and 11, an exemplary embodiment of the lip seal 140 is illustrated. The lip seal 140 includes an annular face 142 having a first surface 144 and a second surface 146 opposite the first surface 144. The first surface 144 faces toward the engine 20 and the second surface 146 faces toward the pump 40. A central opening 148 extends through the center of the annular face 142 and is of a sufficient diameter to receive the first drive shaft 24. An outer ring 150 protrudes generally orthogonal to and around the periphery of the second surface 146. An inner ring 160 protrudes generally orthogonal to and around the periphery of the central opening 148 and in the direction of the second surface 146, and the inner ring 160 protrudes from the annular face 142 for a shorter distance than the outer ring 150. The inner ring 160 includes a first surface 162 and a second surface 164. The first surface 162 faces the center axis of the lip seal 140 and the second surface 164 faces the outer ring 150. According to the illustrated embodiment, the first surface 162 includes a raised portion 165 extending around the inner periphery of the inner ring 160. The raised portion 165 protrudes toward the central axis of the lip seal 140 and is configured to engage the first drive shaft 24 to prevent fluid flow between the lip seal 140 and the first drive shaft 24. The lip seal 140 is preferably constructed of a resilient material and, therefore, the raised portion 165 partially compresses as the lip seal 140 and the seal housing 110 are positioned on the first drive shaft 24. Although an exemplary embodiment of the lips seal 140 has been described above, it is contemplated that the lip seal 140 may take other shapes without deviating from the scope of the invention as long as the lip seal 140 prevents fluid flow between the lip seal 140 and the first drive shaft 24.

Referring next to FIGS. 4-7, an engine 20 and a seal protection system 100 according to another embodiment of the invention is illustrated. The illustrated engine 20 includes a cylinder 22 in which a piston 25 reciprocates. A connecting rod (not shown) joins the piston 25 to a first drive shaft 24 and a second drive shaft 26. For reference, the first drive shaft 24 will be said to extend toward the front of the motor housing 28 and the second drive shaft 26 will be said to extend toward the rear of the motor housing 28. It is understood that various other orientations and descriptions, such as up and down, left and right, or side to side may be used to describe the orientations of the drive shafts 24, 26 without deviating from the scope of the invention.

According to the illustrated embodiment, the engine 20 is a fan-cooled engine. The second drive shaft 26 extends through an opening in the rear of the motor housing 28 and is coupled to a fan 30. The fan 30 includes a plurality of blades which are rotated as the fan rotates via the connection to the second drive shaft 26. Air is drawn in through openings 36 in the fan housing 34. The air may pass through cavities within the engine housing 28 and/or over the outer surface of the engine housing 28 according to the configuration of the air outlets from the fan 30.

The engine 20 is controlled to drive a pump coupled to the first drive shaft 24. The pump is not shown to more clearly illustrate the seal protection system 100. The first drive shaft 24 extends through an opening 27 in the front of the motor housing 28 and receives an outer housing 200 between the engine 20 and the pump. The outer housing 200 is configured to be secured to the motor housing 28 via bolts or other suitable methods as would be understood in the art. The outer housing 200, in combination with the seal housing 110, lip seal 140, and pump seal 70 define the cooling cavity 105 for the seal protection system 100. The outer housing 200 includes a first seat 202 facing toward the engine 20 and configured to engage the outer ring 120 of the seal housing 110. The seal housing 110, in turn, receives the lip seal 140 for engagement with the motor shaft 24. The lip seal prevents the cooling fluid from exiting the cavity 105 towards the engine 20. The outer housing 200 further includes a second seat 204 facing toward the pump and configured to engage the pump seal 70. The pump seal 70 engages the motor shaft 24 and prevents cooling fluid from exiting the cavity 105 towards the pump and similarly prevents fluid from the pump from entering cavity 105. An opening 206 extends through the outer housing 200 and is concentric with the drive shaft 24 when the outer housing 200 is mounted to the motor housing 28.

As discussed above, rotation of the first drive shaft 24 causes heat to be generated at the pump seal 70. The rotating surface and the stationary surface engage each other to prevent leaks; however, the engagement also results in friction during rotation of the drive shaft 24. The friction between the two surfaces generates heat in the pump seal 70. Under normal operating conditions, fluid in the pump will engage the surface of the pump seal 70 facing the pump and provides cooling for the pump seal 70. If the pump is not primed or there is a disruption in the fluid flow through the pump such that no fluid is present on the pump side of the pump seal 70, the cooling fluid in the cavity 105 on the engine side of the pump seal 70 provides cooling to the pump seal 70, thereby preventing excessive heating, damage, or premature failure of the pump seal 70.

Figure 5:
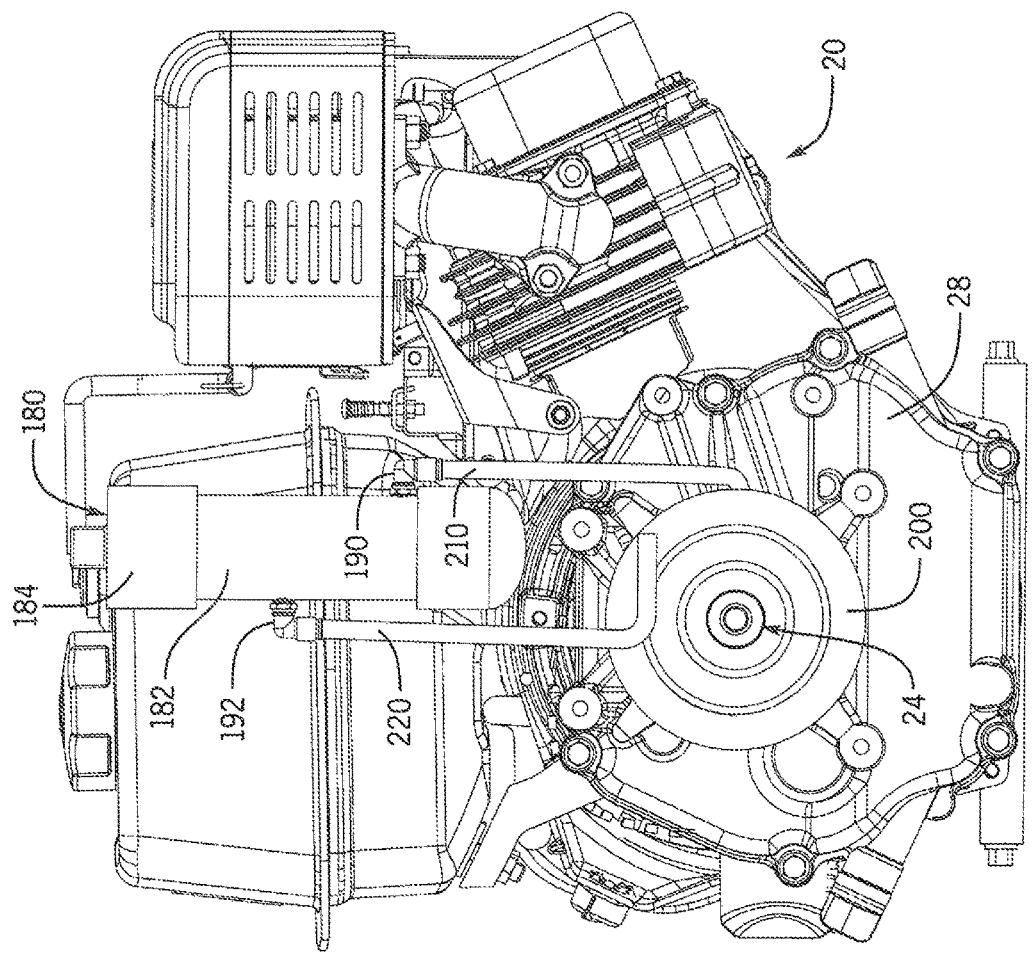
FIG. 5 is an end elevation view of the exemplary pump system of claim 4.
Figure 6:
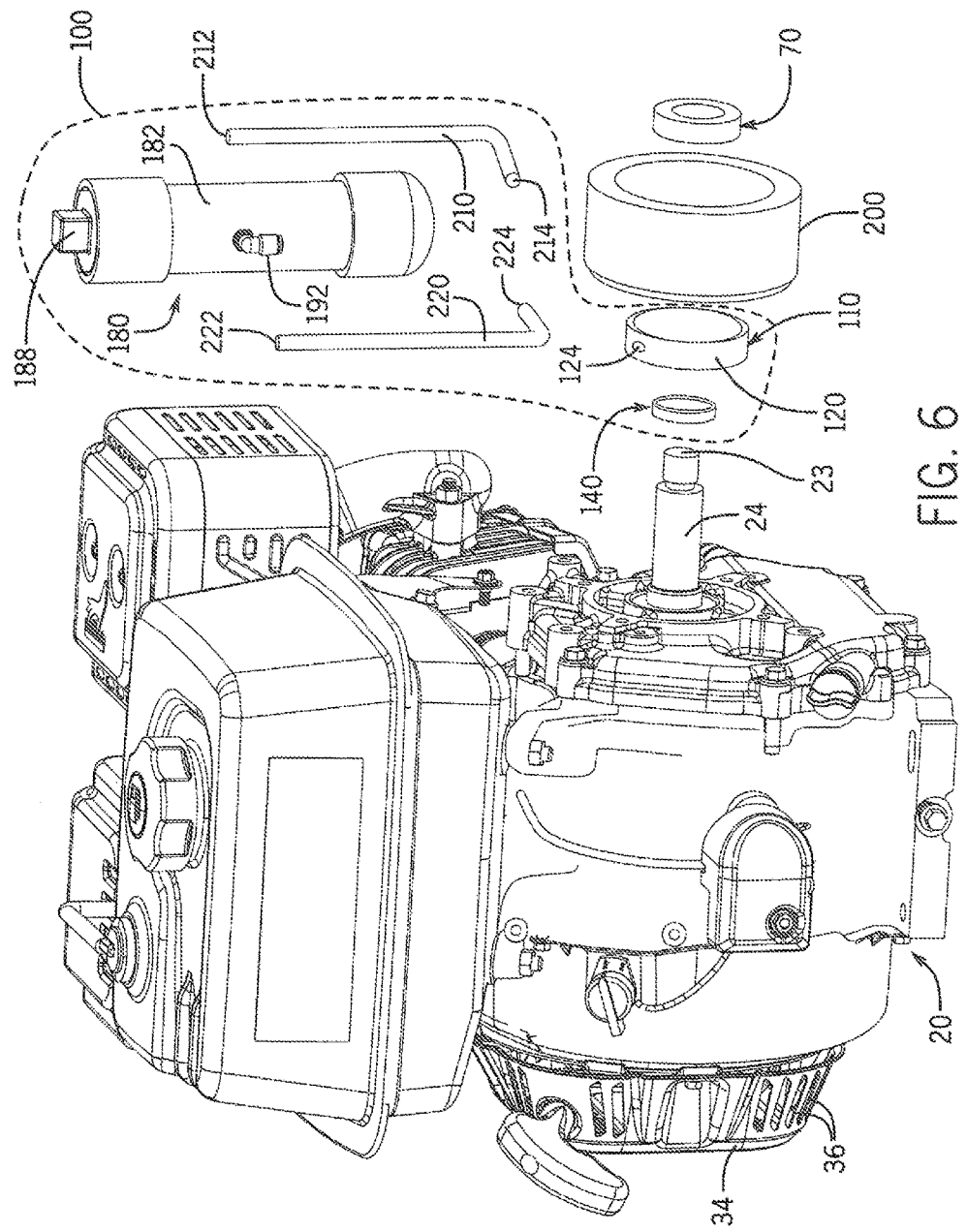
FIG. 6 is a partial exploded view of the exemplary pump system of claim 4.
Figure 7:
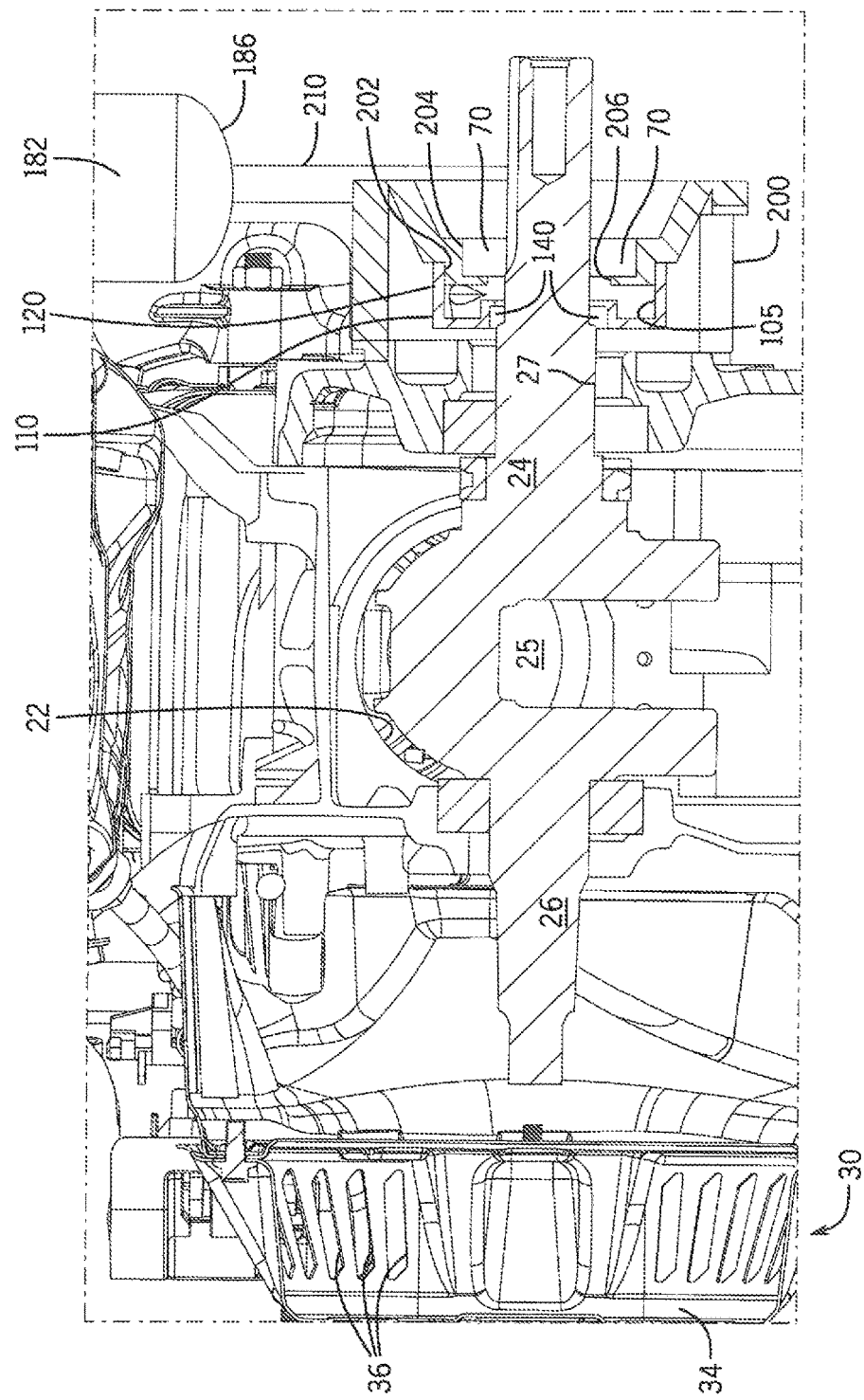
FIG. 7 is a partial sectional view of the exemplary pump system of claim 4.
Figure 12:
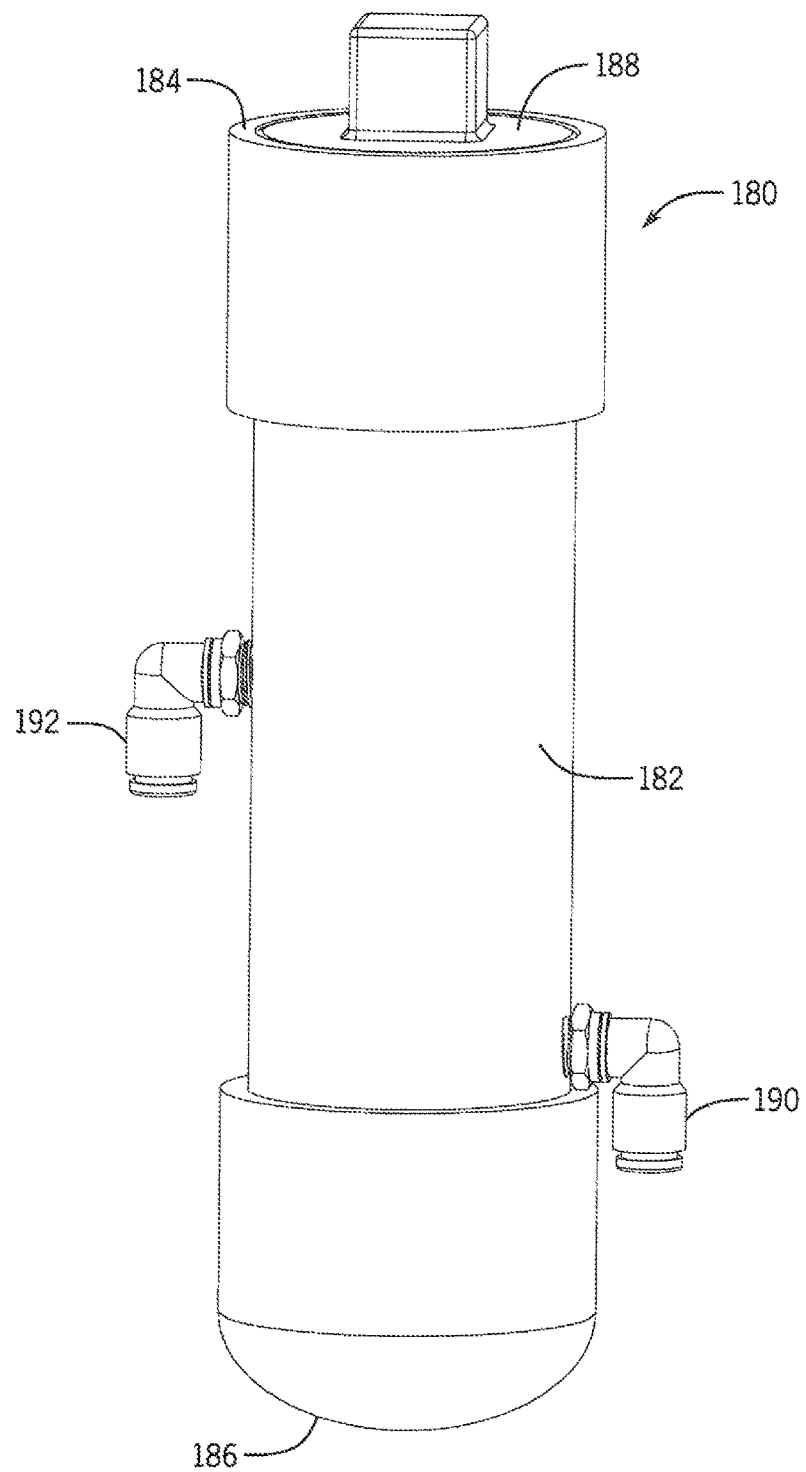
FIG. 12 is a side elevation view of one embodiment of a reservoir for the seal protection system.

With reference to FIGS. 5 and 12, the seal protection system 100 also includes a reservoir 180 configured to hold a cooling liquid or cooling oil which may be cycled through the oil chamber 105 next to the seal 70 between the pump 40 and the engine 20. According to the illustrated embodiment, the reservoir 180 includes a body 182 having a first end 184 and a second end 186. The body 182 has a generally hollow interior in which the cooling liquid may be stored. A plug 188 in the first end 184 is removable to allow for introduction of the cooling liquid within the body 182. The plug 188 preferably includes a method to positively retain the plug 188 within the body 182. The plug 188 may be, for example, threaded or snap-fit onto the body 182 such that the plug 188 prevents the cooling liquid from exiting the body 182. The reservoir 180 further includes an outlet passage 190 and an inlet passage 192. A first end 212 of a supply line 210 is connected to the outlet passage 190 of the reservoir 180, and a second end 214 of the supply line 210 is connected to the inlet passage 122 on the seal housing 110. A first end 222 of a return line 220 is connected to the inlet passage 192 of the reservoir 180, and a second end 224 of the return line 220 is connected to the outlet passage 124 on the seal housing 110.

In operation, the cooling liquid is circulated through the oil chamber 105 to provide additional cooling for the seal 70 between the pump 40 and the engine 20. It is contemplated that the seal protection system 100 operates without the use of an additional pump or actuator for the cooling liquid. However, some embodiments of the invention may include a pump connected in series along either the supply line 210 or the return line 220 or within the reservoir 180 to aid in circulation of the cooling fluid through the seal protection system 100. According to the illustrated embodiment, the seal protection system 100 utilizes gravity and convection to circulate the cooling liquid. Initially, the plug 188 is removed from the first end 184 and cooling liquid is added to the reservoir 180. The cooling liquid is filled to a level between the outlet passage 190 and the inlet passage 192 on the reservoir 180. By positioning the reservoir 180 above the oil chamber 105, cooling liquid also flows from the outlet passage 190 and into the oil chamber 105 as the reservoir 180 is filled. When the reservoir 180 has been filled to the desired level, the plug 188 is reinserted to prevent cooling liquid from escaping the reservoir 180.

During operation of the pump 40, the first drive shaft 24 is rotating within the oil chamber 105. The viscosity of the cooling liquid causes at least a portion of the cooling liquid to follow the rotation of the first drive shaft 24. As a result, if the oil chamber 105 is not full, the cooling liquid is splashed within the oil chamber 105 to cover the chamber. If the oil chamber 105 is full, the rotation of the first drive shaft 24 helps to circulate the cooling liquid within the oil chamber 105. The rear wall of the seal 70 (i.e., the surface facing the engine) defines, at least in part, one side of the oil chamber 105. As the cooling liquid circulates within the oil chamber 105, it moves past the seal 70 drawing heat from the seal 70. As the pump 40 is operated, the temperature of the cooling liquid will begin to increase due to the heat drawn from the seal 70. The temperature of the cooling liquid in the oil chamber 105 becomes greater than the temperature of the cooling liquid in the reservoir 180. As a result of the increasing temperature, the volume of the heated cooling liquid expands, becoming less dense. The heated cooling liquid floats above the cooler cooling liquid and is pushed upward through the return line 220 to the reservoir 180. The cooler cooling liquid in the reservoir is discharged through the outlet passage 190 of the reservoir 180 and flows down the supply line 210 into the oil chamber 105. Thus, a continuous circulation of the cooling liquid past the seal 70 occurs. In addition, heat generated within the seal 70 is dissipated first into the cooling liquid and then drawn out of the pump 40 and into the reservoir 180. If the cooling liquid is heated above the temperature of the ambient air around the reservoir 180, the reservoir 180 acts as a heat exchanger and transfers the heat to the ambient air, which cools the temperature of the cooling liquid, further facilitating the circulation of the cooling liquid within the seal protection system 100.

According to another embodiment of the invention, the seal housing 110 of the seal protection system 100 defines an oil chamber of sufficient size that a separate reservoir is not required. The seal housing 110 may be of non-uniform shape and may, for example, include a second chamber extending upward from the chamber proximate the seal 70. The cooling liquid may still circulate via convection and gravity within the seal housing 110 to provide cooling to the seal 70.

According to still another embodiment of the invention, the cooling liquid may be a material having sufficient heat dissipative qualities that the seal housing 110 may be of the same form as described above yet sufficiently cool the seal 70. It is contemplated that the cooling liquid, for example, may be a grease having sufficient thermal conductive properties to draw heat from the seal 70 to the seal housing 110.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system to protect a first seal between a stationary frame and a rotating shaft, the system comprising:
   a seal housing having an inner surface and an outer surface and including:
   an inlet passage to conduct a cooling fluid,
   an outlet passage to conduct the cooling fluid, and
   an opening extending between the inner and outer surfaces through which the rotating shaft extends, wherein the seal housing is operatively connected to the stationary frame proximate the first seal and wherein the inner surface of the seal housing and a first side of the first seal, at least in part, define a cavity adjacent the first seal, wherein the cavity is in fluid communication with the inlet passage and the outlet passage to receive the cooling fluid;
   a second seal positioned along the outer surface of the seal housing and operatively connected between the opening in the seal housing and the rotating shaft to prevent the cooling fluid from flowing through the opening in the seal housing;
   a reservoir to hold the cooling fluid;
   a supply line in fluid communication between the reservoir and the inlet passage; and
   a return line in fluid communication between the reservoir and the outlet passage.

2. The system of claim 1 wherein the seal housing further comprises:
   a first wall having the opening extending therethrough, the first wall extending generally orthogonal to the rotating shaft; and
   an outer surface extending generally orthogonal to the first wall, around a periphery of the first wall, and towards the seal, wherein the inlet passage and the outlet passage extend through the outer surface.

3. The system of claim 2 wherein the first wall is annular and the outer surface is an outer ring.

4. The system of claim 1 wherein the reservoir includes:
   an outlet in fluid communication with the supply line; and
   an inlet in fluid communication with the return line, wherein the reservoir is located above the seal housing and the inlet is displaced further from the seal housing than the outlet.

5. The system of claim 1 wherein the reservoir includes a pump operable to draw the cooling fluid into the reservoir via the return line and deliver the cooling fluid to the seal housing via the supply line.

6. The system of claim 1 further comprising an outer housing including an opening through which the rotating shaft extends, wherein:
   the outer housing is operatively connected to the stationary frame,
   the outer housing receives the first seal operatively connected between the opening in the outer housing and the rotating shaft to prevent the cooling fluid from flowing through the opening in the outer housing, and
   the seal housing, the outer housing, the first seal, and the second seal define the cavity adjacent the first seal to receive the cooling fluid.

7. A system to protect a first seal between a stationary frame and a rotating shaft, the system comprising:
   a seal housing including:
   an inner surface and an outer surface;
   an inlet passage to conduct a cooling fluid,
   an outlet passage to conduct the cooling fluid, and
   an opening extending between the inner and outer surfaces through which the rotating shaft extends, wherein the seal housing is operatively connected to the stationary frame proximate the first seal and wherein the inner surface of the seal housing and a first side of the first seal, at least in part, define a cavity adjacent the first seal, wherein the cavity is in fluid communication with the inlet passage and the outlet passage to receive the cooling fluid; and a second seal positioned along the outer surface of the seal housing and operatively connected between the opening in the seal housing and the rotating shaft to prevent the cooling fluid from flowing through the opening in the seal housing, wherein the cooling fluid circulates through the cavity via the inlet passage and the outlet passage to cool the first seal.

8. The system of claim 7 wherein the seal housing further comprises:

a first member operatively connected to the stationary frame, wherein the first member includes a first opening through which the rotating shaft extends and wherein the second seal is operatively connected between the first opening in the first member and the rotating shaft to prevent the cooling fluid from flowing through the first opening; and a second member operatively connected to the stationary frame, wherein the second member includes a second opening through which the rotating shaft extends and wherein the first seal is operatively connected between the second opening in the second member and the rotating shaft to prevent the cooling fluid from flowing through the second opening.

9. The system of claim 8 wherein each of the inlet passage and the outlet passage is located in one of the first member and the second member.

10. The system of claim 7 wherein the second seal is integrally formed in the seal housing.

11. The system of claim 7 further comprising:
a reservoir to hold the cooling fluid;
a supply line in fluid communication between the reservoir and the inlet passage; and
a return line in fluid communication between the reservoir and the outlet passage.

12. The system of claim 11 wherein the reservoir includes:
an outlet in fluid communication with the supply line; and
an inlet in fluid communication with the return line, wherein the reservoir is located above the seal housing and the inlet is displaced further from the seal housing than the outlet.

13. The system of claim 11 wherein the reservoir includes a pump operable to draw the cooling fluid into the reservoir via the return line and deliver the cooling fluid to the seal housing via the supply line.

14. A system for protecting a pump seal, wherein the pump seal is mounted to a drive shaft rotated by a prime mover to operate a pump and wherein the pump seal is operatively mounted to the drive shaft to prevent fluid flow from a chamber within the pump along the drive shaft, the system comprising:

a seal housing having:
an inner surface and an outer surface;
an inlet passage to conduct a cooling fluid,
an outlet passage to conduct the cooling fluid, and
an opening extending between the inner and outer surfaces through which the drive shaft extends, wherein the seal housing is operatively connected to a stationary frame proximate the pump seal and wherein the inner surface of the seal housing and a first side of the pump seal, at least in part, define a cavity adjacent the pump seal, wherein the cavity is in fluid communication with the inlet passage and the outlet passage to receive the cooling fluid;

a second seal positioned along the outer surface of the seal housing and operatively connected between the opening in the seal housing and the drive shaft to prevent the cooling fluid from flowing through the opening in the seal housing;

a reservoir to hold the cooling fluid;
a supply line in fluid communication between the reservoir and the inlet passage; and
a return line in fluid communication between the reservoir and the outlet passage.

15. The system of claim 14 wherein the stationary frame to which the seal housing is operatively connected is one of a housing for the prime mover and a housing for the pump.

16. The system of claim 14 wherein the seal housing further comprises:

a first wall having the opening extending therethrough, the first wall extending generally orthogonal to the rotating shaft; and an outer surface extending generally orthogonal to the first wall, around the periphery of the first wall, and towards the pump seal, wherein the inlet passage and the outlet passage extend through the outer surface.

17. The system of claim 16 wherein a face of the outer surface distal from the first wall engages a housing of the pump and wherein the seal housing, the housing of the pump, the pump seal, and the second seal define the cavity adjacent the pump seal to receive the cooling fluid.

18. The system of claim 14 wherein the reservoir includes:

an outlet in fluid communication with the supply line; and
an inlet in fluid communication with the return line, wherein the reservoir is located above the seal housing and the inlet is displaced further from the seal housing than the outlet.

19. The system of claim 14 wherein the reservoir includes a pump operable to draw the cooling fluid into the reservoir via the return line and deliver the cooling fluid to the seal housing via the supply line.

* * * * *